(12) United States Patent
Nakai et al.

(10) Patent No.: US 7,599,133 B2
(45) Date of Patent: Oct. 6, 2009

(54) OPTICAL PART FOR CAMERA AND METHOD OF FABRICATING THE SAME

(75) Inventors: Masaya Nakai, Hirakata (JP); Mitsuaki Matsumoto, Hirakata (JP); Nobuhiko Hayashi, Osaka (JP); Keiichi Kuramoto, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 44 days.

(21) Appl. No.: 12/035,330

(22) Filed: Feb. 21, 2008

(65) Prior Publication Data
US 2008/0204898 A1 Aug. 28, 2008

(30) Foreign Application Priority Data
Feb. 23, 2007 (JP) .............................. 2007-044167
Jul. 30, 2007 (JP) .............................. 2007-197708

(51) Int. Cl.
*G02B 9/00* (2006.01)
(52) U.S. Cl. ........................ 359/796; 359/576; 359/708; 264/1.32

(58) Field of Classification Search ................. 359/708, 359/728, 811, 576, 796, 741; 156/99; 264/1.32
See application file for complete search history.

(56) References Cited

U.S. PATENT DOCUMENTS

| 4,235,654 A | 11/1980 | Dohi et al. | |
| 6,654,174 B1 * | 11/2003 | Huang | ........................ 359/619 |

FOREIGN PATENT DOCUMENTS

| JP | 52-025651 | 2/1977 |
| JP | 54-6006 | 1/1979 |
| JP | 06-222201 | 8/1994 |

* cited by examiner

Primary Examiner—Joseph Martinez
(74) Attorney, Agent, or Firm—Ditthavong, Mori & Steiner, P.C.

(57) ABSTRACT

An optical part for a camera comprising a substrate made of a polyolefin plastic and an optical resin layer placed on the substrate, wherein the surface of the substrate is provided with a polar group and the optical resin layer is formed from a resin composition including a fluorene compound having a (meth)acryloyl group.

9 Claims, 11 Drawing Sheets

(a)

(b)

C1s SPECTRUM OF SURFACE OF
UNTREATED SUBSTRATE

C1s SPECTRUM OF SURFACE OF SUBSTRATE
SUBJECTED TO OXYGEN PLASMA PROCESSING 292 standard

MASS SPECTRUM OF STANDARD SAMPLE 292 extracted from resin

MASS SPECTRUM OF EXTRACTED LIQUID FROM MOLDED ARTICLE

OPTICAL PART FOR CAMERA AND METHOD OF FABRICATING THE SAME

BACKGROUND OF THE INVENTION

1. Field of the Invention

The present invention relates to an optical part for a camera and a method of fabricating the same.

2. Description of Related Art

In recent years, digital cameras and camera-equipped mobile-phones become widespread, and lower-cost and higher-precision lenses are required.

Examples of a lens material include glass and plastic. Since the glass has many species and is abundant in the variation of optical properties, its optical design is easy. Furthermore, since the glass is an inorganic material, it has high reliability and can fabricate a high precision optical part by polishing.

However, glass is high cost, and when an aspheric shape other than a plane or a sphere is formed, a lens has to be formed by use of a special polishing apparatus or by the so-called mold method in which a glass material capable of deforming at low temperatures is molded with an expensive and highly heat resistant mold (made of ceramic) or the like, and therefore production cost becomes high.

As a method of solving the above-mentioned problems, a compound optical part to obtain desired properties by laminating a resin layer on a glass substrate is proposed. In Japanese Unexamined Patent Publication No. 54-6006, a low pass filter, in which an organic polymer layer is formed on a plane glass substrate, is disclosed. In Japanese Unexamined Patent Publication No. 52-25651 and Japanese Unexamined Patent Publication No. 6-222201 and the like, the so-called compound aspheric lens, in which a resin layer having an aspheric shape is formed on a glass substrate, is disclosed.

However, these patents cannot respond to further reductions in cost since glass is used as a substrate. Therefore, it is conceivable to employ a plastic substrate, but a plastic generally has a hygroscopic property. For example, saturated water absorption of an acrylic resin was 2.0%, and that of an olefin resin is 0.1%. Accordingly, when the plastic substrate is employed, an olefin resin having a low water absorption rate is preferable, but when such an olefin resin is used as a substrate, a problem that the adhesion of the substrate to a resin layer to be formed on the substrate is low arises.

SUMMARY OF THE INVENTION

It is an object of the present invention to provide an optical part for a camera, using a substrate made of a polyolefin plastic, which is superior in the adhesion between the substrate and an optical resin layer, and is superior in the mold-releasing properties in forming the optical resin layer.

An optical part for a camera of the present invention comprises a substrate made of a polyolefin plastic and an optical resin layer provided on the substrate, wherein the surface or the substrate is provided with a polar group and the optical resin layer is formed from a resin composition including a fluorene compound having a (meth)acryloyl group.

In the present invention, since the surface of the substrate is provided with a polar group and the optical resin layer is placed on the surface of the substrate provided with a polar group, the optical part for a camera is superior in the adhesion between the substrate and the optical resin layer Examples of a method of providing the surface of the substrate with a polar group include plasma processing such as oxygen plasma processing, nitrogen plasma processing and argon plasma processing, and a UV ozone treatment.

Examples of the polar group provided for the surface of the substrate include —COO, —CO, —OH, —O—$CH_3$, —$NO_2$, —$NH_2$, —NH, and —CN. Among these, particularly, a —COO group is preferable.

The optical resin layer is formed from a resin composition including a fluorene compound having a (meth)acryloyl group. In the present invention, it is preferable to add a hindered amine light stabilizer and/or an ultraviolet absorber to this resin composition. By adding the hindered amine light stabilizer and/or the ultraviolet absorber to the resin composition, the optical part which is superior in the mold-releasing properties in forming the optical resin layer can be formed. Since the optical part is superior in the mold-releasing properties, the surface of the optical resin layer can be formed into a smooth surface and good optical properties can be attained.

Since the optical part of the present invention is intended for cameras, it is not exposed directly to solar light in its applications and therefore the addition of the light stabilizer or the ultraviolet absorber is not necessarily required, but by adding the hindered amine light stabilizer and/or the ultraviolet absorber to the resin composition according to the present invention, the mold-releasing properties can be improved, the rate of defective items can be reduced, and good optical properties can be attained.

Examples of the hindered amine light stabilizer used in the present invention include 2,2,6,6-tetramethyl-4-piperidyl benzoate, N-(2,2,6,6-tetramethyl-4-piperidyl)-dodecyl succinimide, 1-[(3,5-di-tert-butyl-4-hydroxyphenyl)propionyloxyethyl]-2,2,6,6-tetramethyl-4-piperidyl(3,5-di-tert-butyl-4-hydroxyphenyl)propionate, bis(2,2,6,6-tetramethyl-4-piperidyl)sebacate, bis(1,2,2,6,6-pentamethyl-4-piperidyl) sebacate, bis(1,2,2,6,6-pentamethyl-4-piperidyl)-2-butyl-2-(3,5-di-tert-butyl-4-hydroxybenzyl)malonate, N,N'-bis(2,2,6,6-tetramethyl-4-piperidyl)hexamethylenediamine, tetra(2,2,6,6-tetramethyl-4-piperidyl)butanetetracarboxylate, tetra(1,2,2,6,6-pentamethyl-4-piperidyl)butanetetracarboxylate, bis(2,2,6,6-tetramethyl-4-piperidyl)di(tridecyl)butanetetracarboxylate, bis(1,2,2,6,6-pentamethyl-4-piperidyl)di(tridecyl)butanetetracarboxylate, 3,9-bis[1,1-dimethyl-2-{tris(2,2,6,6-tetramethyl-4-piperidyloxycarbonyloxy) butylcarbonyloxyl}-ethyl]-2,4,8,10-tetraoxaspiro[5.5] undecane, 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane, 1,5,8,12-tetrakis[4,6-bis{N-(2,2,6,6-tetramethyl-4-piperidyl)butylamino}-1,3,5-triazin-2-yl]-1,5,8,12-tetrazadodecane, a 1-(2-hydroxyethyl)-2,2,6,6-tetramethyl-4-piperidinol/dimethyl succinate condensation product, a 2-tert-octylamino-4,6-dichloro-s-triazine/N,N'-bis(2,2,6,6-tetramethyl-4-piperidyl)hexamethylenediamine condensation product, and an N,N'-bis(2,2,6,6-tetramethyl-4-piperidyl)hexamethylenediamine/dibromoethane condensation product.

Examples of the ultraviolet absorber used in the present invention include ultraviolet absorbers consisting of benzotriazole compounds, benzophenone compounds, hydroxyphenyl triazine compounds and phenyl salicylate compounds.

Examples of the benzotriazole compounds include 2-(5-methyl-2-hydroxyphenyl)-2H-benzotriazole, 2-[2-hydroxy-3,5-bis(α,αdimethylbenzyl)phenyl]-2H-benzotriazole, 2-(2'-hydroxy-5'-tert-octylphenyl)benzotriazole, and 2,2'-methylenebis[4-(1,1,3,3-tetramethylenebutyl)-6-(2H-benzotriazole-2-yl)phenol]. Examples of the benzophenone compounds include 2-hydroxy-4-octoxybenzophenone, 2,4-dihydroxybenzophenone, 2-hydroxy-4-methoxy-4'- chlorbenzophenone, 2,2-dihydroxy-4-methoxybenzophenone, and 2,2-dihydroxy-4,4'-dimethoxybenzophenone.

And, examples of the ultraviolet absorber consisting of hydroxyphenyl triazine compounds include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-(2-butoxyethoxy)phenyl)-1,3,5-triazine, 2,4-di-p-toluyl-6-(2-hydroxy-4-methoxyphenyl)-1,3,5-triazine, 2,4-di-p-toluyl-6-(2-hydroxy-4-ethoxyphenyl)-1,3,5-triazine, 2,4-di-p-toluyl-6-(2-hydroxy-4-propoxyphenyl)-1,3,5-triazine, 2,4-di-p-toluyl-6-(2-hydroxy-4-butoxyphenyl)-1,3,5-triazine, 2,4-di-p-toluyl-6-(2-hydroxy-4-hexyloxyphenyl)-1,3,5-triazine, 2,4-di-p-toluyl-6-(2-hydroxy-4-octyloxyphenyl)-1,3,5-triazine, 2,4-di-p-toluyl-6-(2-hydroxy-4-dodecyloxyphenyl)-1,3,5-triazine, 2,4-di-p-toluyl-6-(2-hydroxy-4-benzyloxyphenyl)-1,3,5-triazine, and 2,4-di-p-toluyl-6-(2-hydroxy-4-(2-hexyloxyethoxy)phenyl)-1,3,5-triazine. Further, examples of the phenyl salicylate ultraviolet absorbers include p-tert-butylphenyl salicylate and p-octylphenyl salicylate.

The resin composition in the present invention is a resin composition including a fluorene compound having a (meth)acryloyl group. Preferably, the resin composition in the present invention further includes metal alkoxide and a (meth)acrylate monomer.

As the fluorene compound used in the present invention, a fluorene compound having a (meth)acryloyl group is used. Examples of such the fluorene compound include fluorene (meth)acrylates having a 9,9-diphenyl fluorene skeleton. Specific examples of such fluorene acrylates include fluorene acrylates expressed by the following general formula:

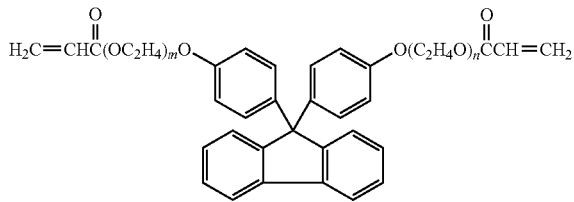

wherein m and n are integers of 0 to 5.

In addition, in the present invention, (meth)acrylate is a generic name for acrylate and methacrylate, and (meth)acryloyl is a generic name for acryloyl and methacryloyl. And, an acryloxy group and an acryloyl group, and a methacryloxy group and a methacryloyl group are used in the same sense, respectively.

Example of the metal alkoxide used in the present invention includes alkoxide of at least one metal of Si, Nb, Ti and Zr. Particularly, metal alkoxide of Si is preferably used. Examples of metal alkoxide of Si include trialkoxysilane and dialkoxysilane. Alkoxysilane containing an alkyl group, an aryl group, or an aryl-containing group is preferably employed. As the aryl group, a phenyl group is preferable. Examples of alkoxysilane having the phenyl group include phenyltrialkoxysilane and diphenyldialkoxysilane, and more specifically include phenyltriethoxysilane, phenyltrimethoxysilane, diphenyldimethoxysilane, and diphenyldiethoxysilane.

Preferably, the resin composition of the present invention contains, as metal alkoxide, metal alkoxide having a functional group which is crosslinked by heating and/or irradiation of energy rays. Thereby, molecules can bond to each other by heating and/or irradiation of energy rays and a bond can be formed between the metal alkoxide and fluorene compounds to form a curable resin composition.

Examples of the energy rays include ultraviolet light, electron beams and the like. Examples of the functional groups to form such a cross-link include a (meth)acryloyl group, a styryl group, an epoxy group, a thiol group, and a vinyl group. Therefore, trialkoxysilane or dialkoxysilane, having these functional groups, is preferably used. Examples of alkoxysilane having the (meth)acryloyl group specifically include 3-methacryloxy propyl methoxysilane, 3-methacryloxy propyl triethoxysilane, p-styryl trimethoxysilane, p-styryl triethoxysilane, 3-acryloxy propyl trimethoxysilane, 3-methacryloxy propyl methyldimethoxysilane, and 3-methacryloxy propyl methyldiethoxysilane. And, examples of alkoxysilane having the vinyl group include vinyl triethoxysilane. Examples of alkoxysilane having the thiol group include (3-mercaptopropyl)methyldimethoxysilane and (3-mercaptopropyl)trimethoxysilane.

Further, when the styryl group is used as a functional group to form a cross-link, an aryl group can be introduced into the resin composition by use of an organic metal compound having the styryl group.

When the metal alkoxide contains a radical polymerizable functional group such as (meth)acryloyl group, styryl group and vinyl group, preferably, a radical polymerization initiator is contained in the resin composition of the present invention.

Examples of the radical polymerization initiators include 1-hydroxycyclohexyl phenyl ketone, 2-hydroxy-2-methyl-1-phenyl-propane-1-on, 2-benzyl-2-dimethylamino-1-(4-morpholinophenyl)-butanone-1, oxy-phenyl-acetic acid 2-[2-oxo-2-phenyl-acetoxy-ethoxy]-ethyl ester, oxy-phenyl-acetic acid 2-[2-hydroxy-ethoxyl]-ethyl ester, and mixtures thereof.

In the present invention, when the metal alkoxide having a functional group to form a cross-link and the metal alkoxide not having a functional group are mixed and used, preferably, a mixing ratio (metal alkoxide having a functional group: metal alkoxide not having a functional group) by weight is 5:95 to 95:5.

And, the (meth)acrylate monomer contained in the resin composition may be a monomer having a functional group, i.e., a monofunctional (meth)acrylate or may be a polyfunctional (meth)acrylate having a plurality of functional groups.

Examples of monofunctional (meth)acrylate include benzyl(meth)acrylate, ethyl(meth)acrylate, methyl(meth)acrylate, isoboronyl(meth)acrylate, cyclohexyl(meth)acrylate, dicyclopentyl(meth)acrylate, α-naphthyl(meth)acrylate, β-naphthyl(meth)acrylate, dicyclopentenyl oxyethyl(meth)acrylate, boronyl(meth)acrylate, phenyl(meth)acrylate and the like.

Examples of polyfunctional (meth)acrylate include difunctional (meth)acrylates such as ethylene glycol di(meth)acrylate, propylene glycol di(meth)acrylate, polyethylene glycol di(meth)acrylate, polypropylene glycol di(meth)acrylate, 1,6-hexanediol(meth)acrylate, glycerin di(meth)acrylate, di(meth)acrylate of 2,2-dimethyl-3-hydroxypropyl-2,2-dimethyl-3-propionate, 1,4-butanediol di(meth)acrylate, neopentyl glycol di(meth)acrylate, di(meth)acrylate of neopentylglycol hydroxypivalate, di(meth)acrylate of propyleneoxide addition products of bisphenol A, di(meth)acrylate of 2,2'-di(hydroxypropoxyphenyl)propane, di(meth)acrylate of 2,2'-di(hydroxyethoxyphenyl)propane, di(meth)acrylate of ethyleneoxide addition products of bisphenol A, di(meth)acrylate of tricyclodecanedimethylol, a di(meth)acrylic acid addition product of 2,2'-di(glycidyloxyphenyl)propane and the like; and pentaerythritol tri(meth)acrylate, pentaerythritol tetra(meth)acrylate, trimethylolpropane tri(meth)acrylate, dipentaerythritol hexa(meth)acrylate, tri(meth)acrylate of trimellitic acid, triallyl trimellitate, tri(meth)acrylate of triallyl isocyanurate and tris(2-hydroxyethyl)isocyanurate, tri(meth)acrylate of tris(hydroxypropyl)isocyanurate, tetramethylolmethane tri(meth)acrylate, tetramethylolmethane tetra(meth)acrylate and the like.

And, preferably, the resin composition further includes (meth)acrylate having one or more aryl groups.

Examples of the (meth)acrylate having one or more aryl groups include benzyl(meth)acrylate, phenoxyethyl(meth)acrylate, phenoxypropyl(meth)acrylate, acryloyloxyethyl phthalate, cresol(meth)acrylate, p-cumylphenoxy ethylene glycol(meth)acrylate, tribromophenyl(meth)acrylate, bisphenol A di(meth)acrylate, bisphenol F di(meth)acrylate, phthalate di(meth)acrylate, trimethylolpropane benzoate (meth)acrylate, naphthyl(meth)acrylate and hydroxyethylated o-phenylphenol(meth)acrylate, and ethyleneoxide addition (EO modified) products, propyleneoxide addition (PO modified) products and ethylcyclohexane addition (ECH modified) products thereof.

In the resin composition of the present invention, preferably, the content of the fluorene compound is 20 to 83% by weight, and more preferably 30 to 50% by weight. Preferably, the content of the metal alkoxide is 7 to 70% by weight, and more preferably 10 to 40% by weight. Preferably, the content of the (meth)acrylate monomer is 10 to 70% by weight And, in the resin composition, preferably, the total addition amount of a hindered amine light stabilizer and an ultraviolet absorber is in a range of 0.5 to 2.0% by weight with respect to 100% by weight of a resin component, and more preferably in a range of 0.7 to 1.8% by weight. When this amount is too small, mold-releasing properties may be deteriorated. And, when this amount is too large, the adhesion between the substrate and the optical resin layer and the reliability may be deteriorated. Further, when the radical polymerization initiator is added to the resin composition, preferably, its content is 0.3 to 3% by weight, and more preferably 0.3 to 1.5% by weight.

As the substrate in the present invention, the substrate made of a polyolefin plastic is used. Among the polyolefin plastics, particularly, alicyclicolefin ispreferablyused from the viewpoint of optical properties. Examples of the alicyclic olefin include a trade name "ZEONEX" (produced by ZEON Corporation), a trade name "TOPAS" (produced by Ticona Inc.), and a trade name "ARTON" (produced by JSR Corporation).

In the present invention, the polar group of the surface of the substrate can be analyzed by, for example, electron spectroscopy for chemical analysis (ESCA). For example, a bond C—C, a bond C—O, a bond C=O, and a bond COO, which exist at the surface of the substrate, can be measured by ESCA. A ratio between the bonds can be determined from peak areas of these bonds. In the present invention, preferably, a ratio of a bond COO to a bond C—C at the surface of the substrate is 0.06 or more, and more preferably is 0.20 or more. By setting the ratio of a bond COO to a bond C—C within such boundaries, the adhesion between the substrate and the optical resin layer can be enhanced.

A production method of the present invention is a method by which the above-mentioned optical part for a camera of the present invention can be fabricated, comprising the steps of providing a polar group for the surface of the substrate by applying plasma processing to the surface of the substrate, and placing the above-mentioned resin composition on the surface of the substrate provided with a polar group and curing the resin composition with a mold pressed against the resin composition to form an optical resin layer.

In accordance with the production method of the present invention, the optical part for a camera, which has excellent mold-releasing properties in forming the optical resin layer, and has excellent adhesion between the substrate and the optical resin layer, can be fabricated. Therefore, the optical part for a camera having excellent optical properties can be fabricated efficiently.

Examples of the plasma processing for providing the polar group for the surface of the substrate include oxygen plasma processing, nitrogen plasma processing, and argon plasma processing. These plasma processing can be performed by carrying out the plasma processing in an atmosphere of an oxygen gas, a nitrogen gas or an argon gas. In the present invention, the oxygen plasma processing is particularly preferably employed.

The resin composition can be cured by heating and/or irradiation of energy rays. As the irradiation of energy rays, ultraviolet irradiation is particularly preferable.

Examples of the optical part for a camera of the present invention include a compound aspheric lens, a microlens array, an optical filter, and a diffraction grating.

In accordance with the present invention, the optical part for a camera, which has the excellent adhesion between the substrate and the optical resin layer, and has the excellent mold-releasing properties in forming the optical resin layer, can be formed. Therefore, in accordance with the present invention, the optical part for a camera having the excellent optical properties and high production efficiency can be formed.

DETAILED DESCRIPTION OF THE PREFERRED EMBODIMENTS

Hereinafter, the present invention will be described by way of specific examples, but the present invention is not limited to the following examples.

<Experiment 1>

(Preparation of Si Alkoxide Solution)

As metal alkoxide, Si alkoxide was used. A Si alkoxide solution was prepared by mixing 3-methacryloxy propyl triethoxysilane and diphenyldimethoxysilane as a Si alkoxide so as to be 1:1 by mole, and mixing 2N hydrochloric acid and ethanol in the resulting mixture to be left standing for 24 hours.

(Preparation of Resin Composition)

As a fluorene compound, fluorene acrylate which the above-mentioned structural formula (1) represents when m and n are 1 was used.

0.757 g of fluorene acrylate, Si alkoxide solution (solid content 0.259 g), 1.25 g of hydroxyethylated o-phenylphenol methacrylate, 0.245 g of pentaerithritol triacrylate, and 0.015 g of a photopolymerization initiator (trade name "IRGACURE 184", produced by Ciba Specialty Chemicals K.K.) were mixed while heating and stirring the mixture at 180° C. to prepare a solution of a resin composition.

In addition, here, a resin composition was prepared without adding a hindered amine light stabilizer and an ultraviolet absorber.

(Surface Treatment of Substrate)

A substrate made of alicyclic olefin (trade name "ZEONEX (E48R)", produced by ZEON Corporation) was used as a substrate, and plasma processing was applied to the surface of the substrate in a manner described below.

As plasma processing equipment, a plasma reactor (manufactured by YAMATO SCIENTIFIC Co., Ltd., model: PR-501A, oscillation section: RFG-500A, reaction section: PC-101A, Oscillating Frequency 13.56 MHz) was used.

The oxygen plasma processing or the low pressure plasma processing was performed under the following conditions.

Oxygen plasma processing: degree of vacuum 0.8 Torr

Background pressure: Oxygen was introduced at a flow rate of 70 sccm at a pressure of 0.5 Torr Power: 400 W, plasma treating time: 1 second or 60 seconds Low pressure plasma processing A plasma chamber was evacuated from atmospheric pressure with a rotary pump. Oxygen was not introduced.

Degree of vacuum: 0.5 Torr

Power: 500 W

Plasma treating time: 10 seconds

In the above description, with respect to the substrates subjected to the oxygen plasma processing for 60 seconds, some of the substrates were left standing at room temperature for 40 days in the air after the oxygen plasma processing.

(Preparation of Optical Part)

Optical resin layers were formed on the surfaces of the substrate, onto which the oxygen plasma processing or the low pressure plasma processing was applied as described above, using the above-mentioned resin composition to prepare optical parts. Further, optical parts formed by using a substrate not subjected to the plasma processing as a substrate were also prepared.

Figure 1:
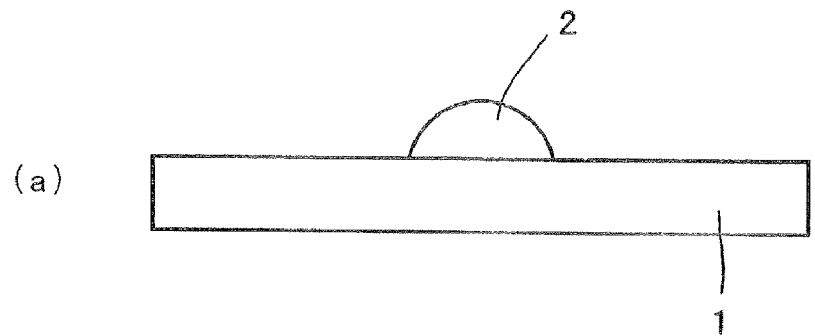
FIGS. 1A and 1B are a side view and a plan view showing an optical part for evaluations prepared in an example according to the present invention.

FIG. 1 is a view showing the prepared optical part. FIG. 1A is a side view, and FIG. 1B is a plan view.

As illustrated in FIG. 1, the optical resin layer 2 is formed on the substrate 1. A thickness of the optical resin layer 2 is 100 μm and a diameter is 10 mm.

Figure 2:
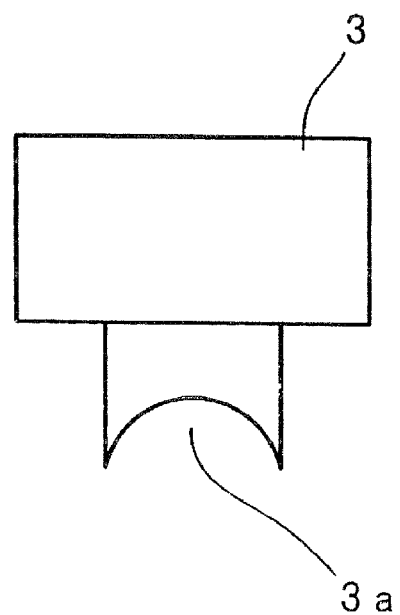
FIG. 2 is a side view showing a mold.

FIG. 2 is a side view showing a mold for forming the optical resin layer 2. The mold 3 is made of STAVAX, and its surface is plated with Ni—P through an electroless process. A concave portion 3a is formed at the tip of the mold, and the optical resin layer 2 is formed through this concave portion 3a. A depth and a diameter of the concave portion 3a are 100 μm and 10 mm, respectively.

The optical resin layer 2 was formed as follows.

A solution of the above-mentioned resin composition is placed on the substrate 1, and a mold 3 shown in FIG. 2 is located on the resin composition, and the resin composition is pressed by moving the mold 3 downward, and ultraviolet light is irradiated to the substrate 1 at irradiation energy of 300 mW/cm$^2$ for 30 seconds from under the substrate 1 with the resin composition held in a concave portion 3a of the mold 3 and is irradiated to the resin composition in the concave portion 3a of the mold 3 to cure the resin composition. After curing, the mold 3 is removed, and the resin composition is heated for 6 hours at 100° C. to perform a baking treatment.

Thus, the optical resin layer 2 can be formed.

[Analysis of Surface of Substrate]

The polar group of the surface of the substrate was analyzed by ESCA. ESCA 5600 manufactured by ULVAC-PHI, Inc. was used as an ESCA analyzer. MgKα was used as an X-rays source, and X-rays were irradiated to the sample at 1253.6 eV. An output was 400 W, a pass energy was set at 23.5 eV, and data acquisition per one step was carried out in 0.125 eV increments.

C1s peaks were measured scanning from 300 eV to 280 eV. O1s peaks were measured scanning from 545 eV to 525 eV.

Figure 7:
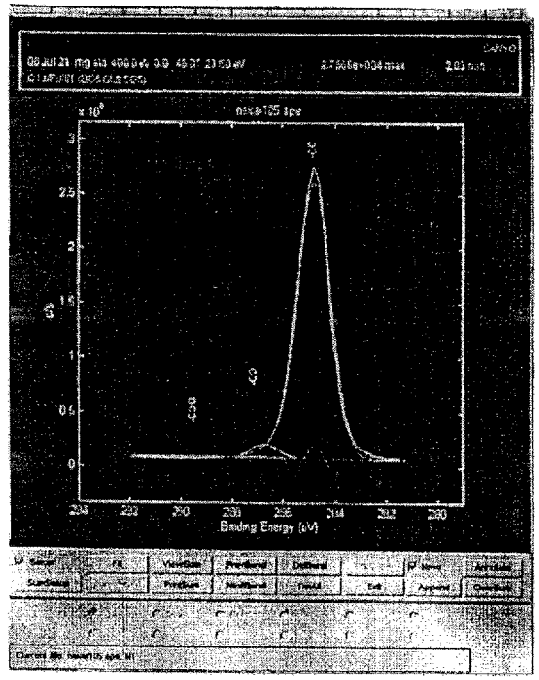
FIG. 7 is a view showing a C1s spectrum of the surface of a substrate not subjected to processing by ESCA.
Figure 8:
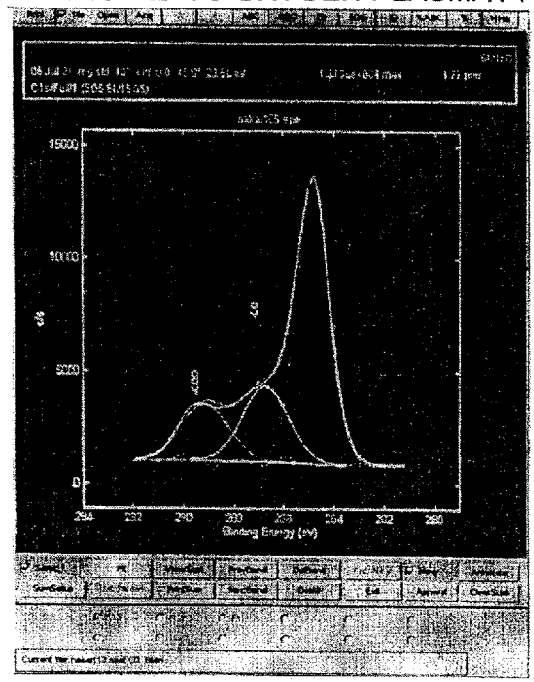
FIG. 8 is a view showing a C1s spectrum of the surface of a substrate subjected to oxygen plasma processing by ESCA.

FIG. 7 shows a C1s spectrum of a substrate not subjected to processing, and FIG. 8 shows a C1s spectrum of a substrate subjected to oxygen plasma processing (60 seconds).

After bond energy of a bond C—C was corrected to 284.8 eV for charge, bond energy of a bond C—O was corrected to 286.7 eV, bond energy of a bond C=O was corrected to 287.7 eV, and bond energy of a bond COO was corrected to 289.2 eV, and each peak of the bonds was separated by a Gaussian-Lorentz curve fitting process. An area of each peak was calculated, and ratios of areas of peaks (to the total of areas of peaks of the bond C—C, the bond C—C, the bond C=O and the bond COO) corresponding to the bond energy of a bond C—C and the bond energy of a bond COO are shown in Table 2. And, in Table 2, a ratio of area of peak of the bond COO to area of peak of the bond C—C (COO/CC) was shown.

[Reliability Test]

A reliability test was performed on the optical part for evaluations shown in FIG. 1. An ambient temperature was changed from −40° C. to 85° C. and a set of these tests was treated as a cycle. Reliability test was performed by repeating 250 cycles.

After 250 cycles elapsed, the presence or absence of peeling in an interface between the substrate and the optical resin layer was observed with an optical microscope, and the reliability was rated according to the following criteria.

o: No peeling in an interface occurs x: Peeling occurs a little in an interface

The results of evaluations are shown in Table 1.

[Adhesive Force Evaluation Test]

Figure 3:
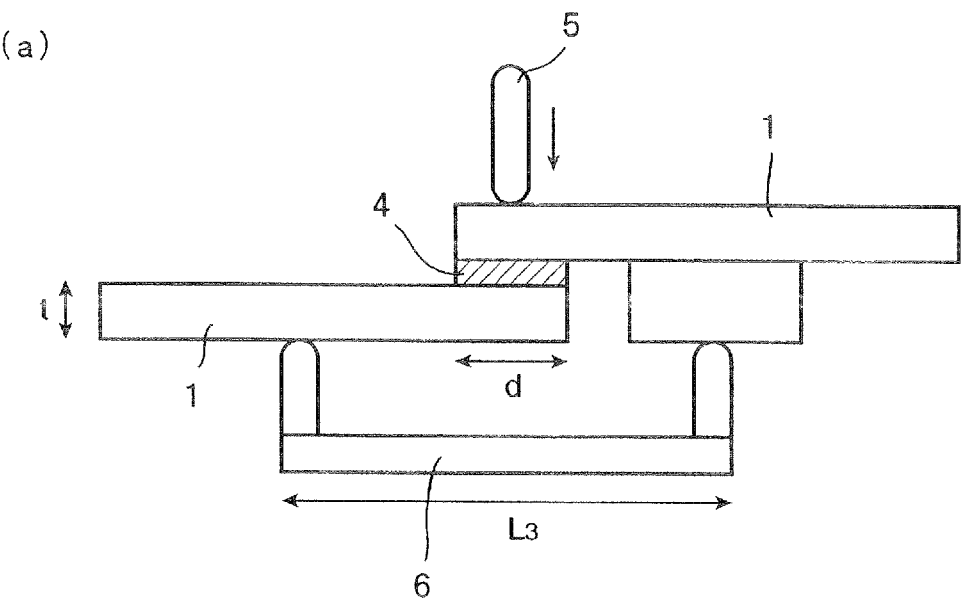
FIGS. 3A and 3B are a side view and a plan view showing a test piece for measuring an adhesive force and a measuring method.
Figure 3:
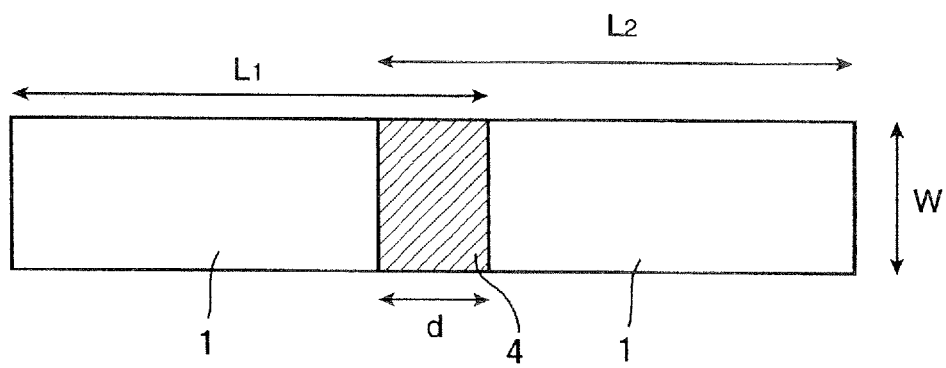

A test piece for evaluating an adhesive force shown in FIG. 3 was prepared. FIG. 3A is a side view and FIG. 3B is a plan view. As shown in FIG. 3A, two substrates 1 are opposed to each other out of alignment, and an optical resin portion 4 was formed at an area between two substrates, where two substrates overlap. As a substrate 1, 5 kinds of substrates, i.e., substrates not subjected to the plasma processing, subjected to the low pressure plasma processing (0.5 Torr), the oxygen plasma processing (60 seconds, left standing in the air), the oxygen plasma processing (1 second) and the oxygen plasma processing (60 seconds), were used as with the above case. The substrate having a size of 33 mm, respectively, in length $L_1$, $L_2$, 13 mm in width W and 2 mm in thickness was used.

The area where two substrates 1 overlap to become an optical resin portion 4 was formed in such a way that a length d is 9 mm, a width W is 13 mm and a thickness is 0.02 mm. This area was irradiated for 30 seconds at energy density of 300 mW/cm² with ultraviolet light, and then baked at 100° C. for 1 hour to form an optical resin portion 4.

The adhesive force was measured according to JIS K 6854 (Testing methods for flexural strength of adhesive bonds). As shown in FIG. 3, the test piece was supported at both ends of a supporting stage 6 and a distance between supporting points was 30 mm.

An indenter 5 was pressed down at a speed of 0.5 mm/min from above against the area where two substrates 1 overlap, at which the optical resin portion 4 was formed, to perform a 3-point bending test. Breaking strength at the optical resin portion 4 in this time was assumed as an adhesive force. The results of the measurements are shown in Table 1.

Further, the ratios of polar group COO to polar group CC shown in Table 2 are shown together in Table 1.

TABLE 1

| Surface Treatment of Substrate | Adhesive Force (N) | Ratio of Polar Group COO to Polar Group CC | Reliability Test |
|---|---|---|---|
| Not Subjected to Processing | 7 | 0.00 | X |
| Low Pressure Plasma Processing (0.05 Torr) | 34 | 0.06 | ○ |
| Oxygen Plasma Processing (60 sec, Left Standing in the Air) | 33 | 0.07 | ○ |
| Oxygen Plasma Processing (1 sec) | 34 | 0.14 | ○ |
| Oxygen Plasma Processing (60 sec) | 66 | 0.28 | ○ |

TABLE 2

| | Peak Position: eV | | |
|---|---|---|---|
| | CC | COO | Ratio of COO to CC |
| Bond Energy (eV) | 284.8 | 289.2 | |
| Not Subjected to Processing | 96 | 0.0 | 0.00 |
| Low Pressure Plasma Processing (0.05 Torr) | 82 | 4.8 | 0.06 |
| Oxygen Plasma Processing (60 sec, Left Standing in the Air) | 76 | 5.6 | 0.07 |
| Oxygen Plasma Processing (1 sec) | 71 | 10 | 0.14 |
| Oxygen Plasma Processing (60 sec) | 61 | 17 | 0.28 |

Figure 4:
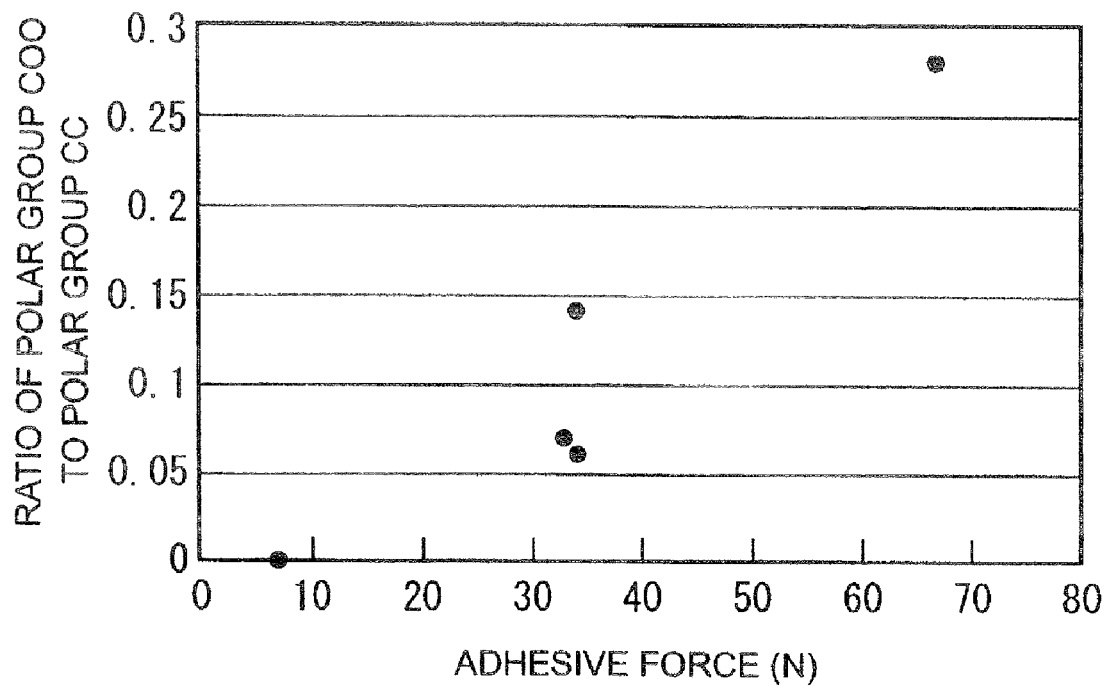
FIG. 4 is a view showing a relationship between an adhesive force of a substrate to an optical resin layer and a ratio of a polar group COO to a polar group CC at the surface of the substrate.

FIG. 4 is a view showing a relationship between an adhesive force and a ratio of a polar group COO to a polar group CC, which are shown in Table 1.

As shown in Table 1, it is understood that in the case of using the substrate subjected to the plasma processing, the adhesive force between the substrate and the optical resin layer is improved compared with the case of using the substrate not subjected to processing.

And, as shown in Table 1 and FIG. 4, it is understood that when the ratio of a polar group COO to a polar group CC is larger, the adhesion between the substrate and the optical resin layer is more excellent. Preferably, the ratio of a polar group COO to a polar group CC is 0.06 or more, and more preferably is 0.20 or more.

And, as is apparent from Table 1, it is understood that reliability is also improved in the reliability test compared with the substrate not subjected to processing when the substrate is subjected to the plasma processing.

From the above description, it is understood that the adhesion between the substrate and the optical resin layer is improved by applying the plasma processing to the substrate to provide the polar group for the substrate in accordance with the present invention.

<Experiment 2>

Next, an example in which an optical resin layer was formed by adding a hindered amine light stabilizer or an ultraviolet absorber to a resin composition will be described.

(Preparation of Resin Composition)

As with the above-mentioned Experiment 1, the hindered amine light stabilizer (trade name: "TINUVIN 292", produced by Ciba Specialty Chemicals K.K.) or the ultraviolet absorber (trade name: "TINUVIN 400", produced by Ciba Specialty Chemicals K.K.) was mixed in a mixture of 0.757 g of fluorene acrylate, Si alkoxide solution (solid content 0.259 g), 1.25 g of hydroxyethylated o-phenylphenolic methacrylate, 0.245 g of pentaerithritol triacrylate and 0.015 g of a photopolymerization initiator (IRGACURE 184) while heating and stirring the mixture at 100° C. in such a way that an addition amount of the hindered amine light stabilizer or the ultraviolet absorber was that shown in Table 3 or 4.

In the above-mentioned blending composition, with respect to the total of the resin components, an amount of fluorene acrylate is about 30% by weight, that of Si alkoxide is about 10% by weight, that of hydroxyethylated o-phenylphenol methacrylate is about 50% by weight, and that of pentaerithritol triacrylate is about 10% by weight. And, an amount of the photopolymerization initiator is 0.60% by weight with respect to 100% by weight of the resin components.

And, the addition amounts of the hindered amine light stabilizer and the ultraviolet absorber shown in Table 3 and Table 4 are the addition amounts with respect to 100% by weight of the resin components.

TINUVIN 292 used as a hindered amine light stabilizer (HALS) is a mixture of compounds shown below

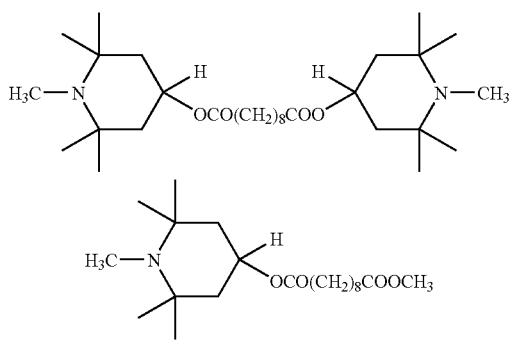

TINUVIN 400 used as an ultraviolet absorber (UVA) comprises a compound shown below in an amount about 85%, and 1-methoxy-2-propanol in an amount about 15%.

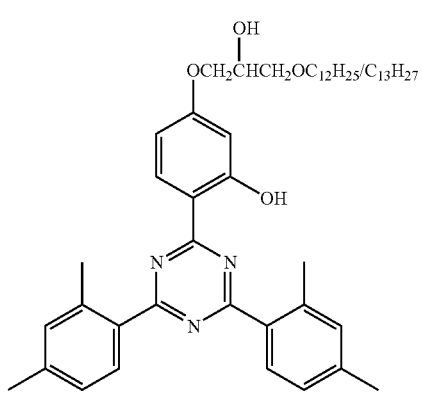

(Preparation of Optical Part)

An optical part for evaluations shown in FIG. 1 was prepared using a mold 3 shown in FIG. 2 by following the same procedure as in Experiment 1 described above. Further, the substrate subjected to the oxygen plasma processing (60 seconds) was used as a substrate. An optical resin layer was formed using the mold 3, and then a ratio of area of the resin, attached to the mold after removing the mold, was measured. This ratio of area was shown in Table 3 and Table 4 as a mold-releasing property. A test piece shown in FIG. 3 was prepared by following the same procedure as in Experiment 1 described above, and an adhesive force was measured. The results of measurements are shown in Table 3 and Table 4.

TABLE 3

| Addition Amount of HALS | Mold-Releasing Properties (Ratio of Area of Resin Attached to Mold) | Adhesive Force (N) |
|---|---|---|
| 0.0% | 90% | 66 |
| 0.5% | 60% | 58 |
| 1.5% | 0% | 52 |
| 3.0% | 10% | 29 |

TABLE 4

| Addition Amount of UVA | Mold-Releasing Properties (Ratio of Area of Resin Attached to Mold) | Adhesive Force (N) |
|---|---|---|
| 0.0% | 90% | 66 |
| 0.5% | 15% | 46 |
| 1.1% | 0% | 42 |
| 2.5% | 80% | 31 |

Figure 5:
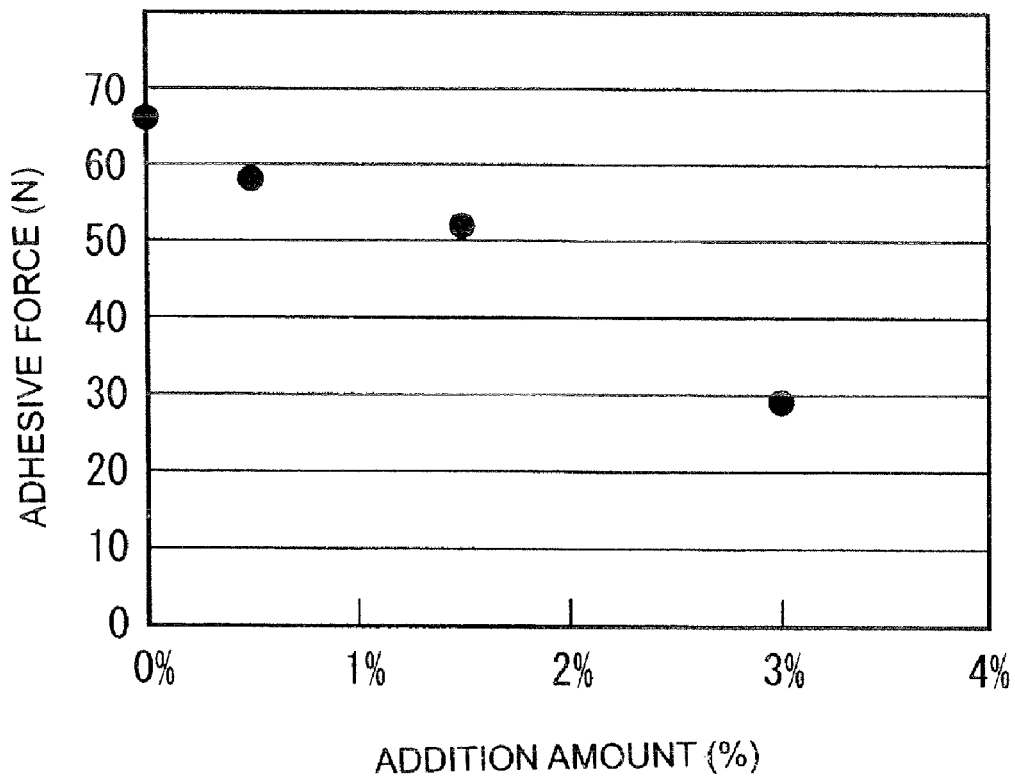
FIG. 5 is a view showing a relationship between an addition amount of a hindered amine light stabilizer (HALS) and an adhesive force.
Figure 6:
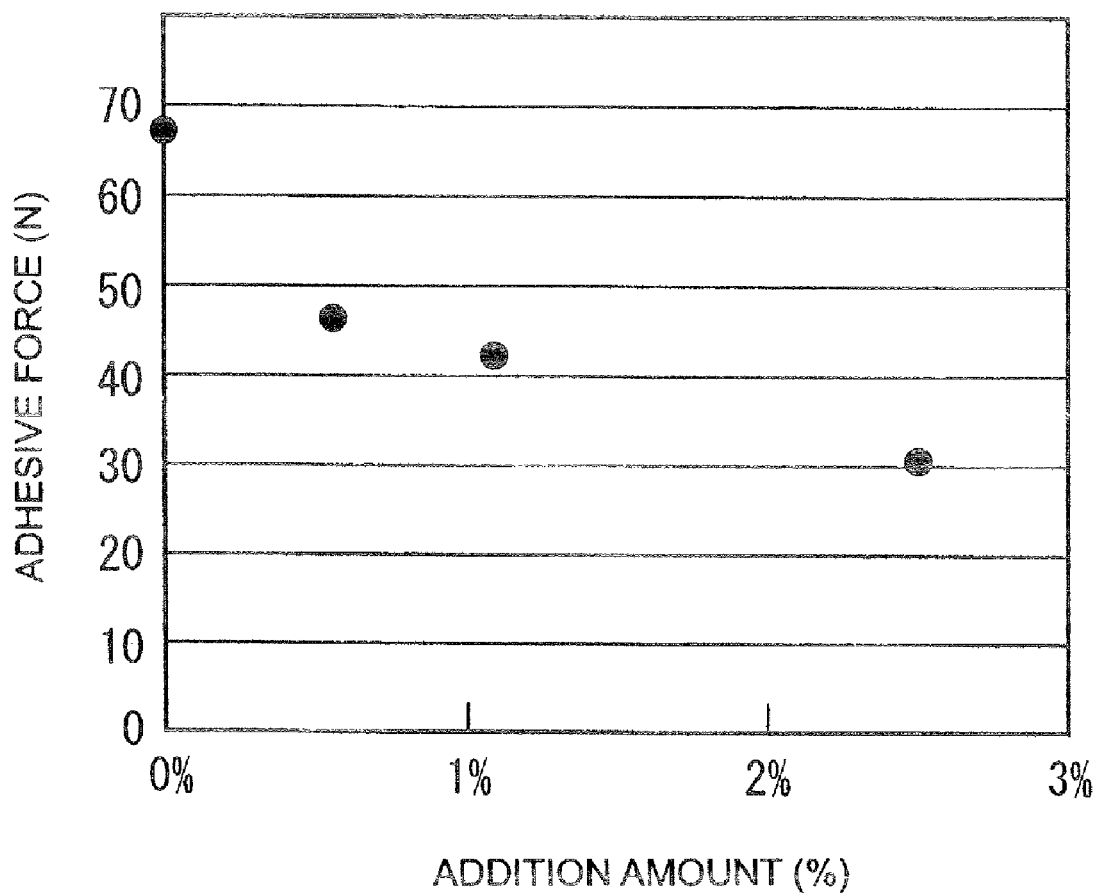
FIG. 6 is a view showing a relationship between an addition amount of an ultraviolet absorber (UVA) and an adhesive force.

A relationship between an addition amount of HALS and an adhesive force, shown in Table 3, is shown in FIG. 5. And, a relationship between an addition amount of UVA and an adhesive force, shown in Table 4, is shown in FIG. 6. As is apparent from Table 3 and Table 4, the ratio of area of the resin attached to the mold can be reduced and the mold-releasing properties can be improved by adding HALS or UVA to the resin composition. However, if an addition amount of HALS or UVA is too large, the ratio of area of the resin attached to the mold is increased.

And, as is apparent from Tables 3 and 4, and FIGS. 5 and 6, the adhesive force is reduced when HALS or UVA is added to the resin composition.

It is understood that it is particularly preferable from the viewpoint of the mold-releasing properties and the adhesive force that the addition amount of HALS or UVA to the resin composition is in a range of 0.5 to 2.0% by weight with respect to 100% by weight of a resin component.

<Experiment 3>

A resin composition, to which the hindered amine light stabilizer and the ultraviolet absorber were not added, was prepared by following the same procedure as in Experiment 1 except for using a substrate made of alicyclic olefin copolymer (trade name: "TOPAS", produced by Ticona Inc.) as a substrate, and using this resin composition, optical resin layers were formed on the substrates, which was subjected to or not subjected to the oxygen plasma processing, to prepare optical parts.

In the same manner as in Experiment 1, the surface of each substrate was analyzed to determine a ratio of a polar group COO to a polar group CC.

Further, in the same manner as in Experiment 1, an adhesive force evaluation test and a reliability test were performed. The results of evaluations are shown in Table 5.

TABLE 5

| Plasma Processing Conditions (TOPAS) | Adhesive Force (N) | Ratio of Polar Group COO to Polar Group CC | Reliability Test |
|---|---|---|---|
| Not Subjected to Processing | 7 | 0 | X |
| Oxygen Plasma Processing (60 sec, Left Standing in the Air) | 40 | 0.105 | ○ |
| Oxygen Plasma Processing (1 sec) | 46 | 0.107 | ○ |
| Oxygen Plasma Processing (60 sec) | 63 | 0.179 | ○ |

As shown in Table 5, by applying the oxygen plasma processing to the substrate according to the present invention, a polar group is introduced in the surface of the substrate and the ratio of a polar group COO to a polar group CC is increased as with the case of using ZEONEX as a substrate. And, by an increase in the ratio of a polar group COO to a polar group CC, the adhesion between the substrate and the optical resin layer is improved, and the reliability is also improved As shown in Table 5, it is understood that it is preferable from the viewpoint of adhesion and reliability that the ratio of a polar group COO to a polar group CC is 0.06 or more.

Figure 13:
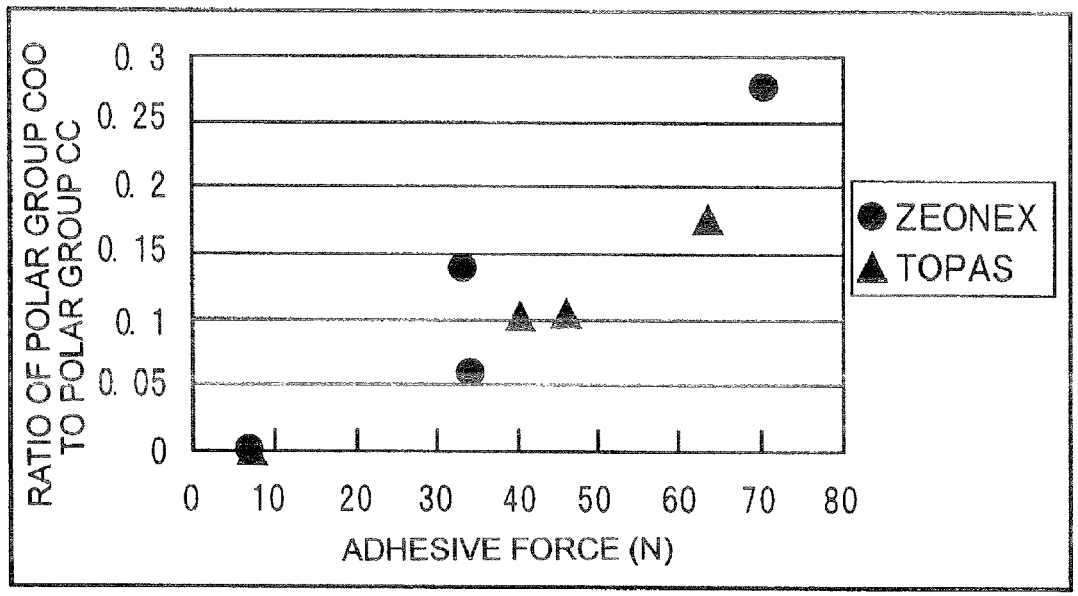
FIG. 13 is a view showing a relationship between an adhesive force of a substrate to an optical resin layer and a ratio of a polar group COO to a polar group CC at the surface of the substrate.

FIG. 13 is a view showing a relationship between a ratio of a polar group COO to a polar group CC and an adhesive force, which are shown in Table 1 and Table 5. As is apparent from FIG. 13, it is understood that in using either ZEONEX or TOPAS as a substrate, the adhesive force is improved by an increase in the ratio of a polar group COO to a polar group CC.

Next, an example, in which an optical resin layer was formed by adding a hindered amine light stabilizer (HALS) or an ultraviolet absorber (UVA) to a resin composition as with Experiment 2, will be described.

A resin composition was prepared in the same manner as in Experiment 2. As for the hindered amine light stabilizer (HALS), resin compositions to which HALS was added in an amount 0% by weight, 0.5% by weight, 1.5% by weight, and 3.0% by weight, respectively, were prepared. And, as for the ultraviolet absorber (UVA), resin compositions to which UVA was added in an amount 0% by weight, 0.5% by weight, 1.1% by weight, and 2.5% by weight, respectively, were prepared.

ZEONEX and TOPAS were used as a substrate, and optical resin layers were formed on the substrates using the above-mentioned resin compositions to prepare optical parts An adhesive force of each of the obtained optical parts was measured The results of measurements are shown in Tables 6 to 9.

TABLE 6

| Surface Treatment of Substrate (ZEONEX) | Ratio of Polar Group COO to Polar Group CC | Adhesive Force (N) Addition Amount of HALS (% by Weight) | | | |
|---|---|---|---|---|---|
| | | 0% | 0.5% | 1.5% | 3.0% |
| Not Subjected to Processing | 0 | 7 | 7 | 7 | 7 |
| Oxygen Plasma Processing (1 sec) | 0.14 | 33 | 31 | 25 | 15 |
| Oxygen Plasma Processing (60 sec) | 0.28 | 66 | 58 | 52 | 29 |

TABLE 7

| Surface Treatment of Substrate (TOPAS) | Ratio of Polar Group COO to Polar Group CC | Adhesive Force (N) Addition Amount of HALS (% by Weight) | | | |
|---|---|---|---|---|---|
| | | 0% | 0.5% | 1.5% | 3.0% |
| Not Subjected to Processing | 0 | 7 | 7 | 7 | 7 |
| Oxygen Plasma Processing (1 sec) | 0.107 | 46 | 26 | 20 | 15 |
| Oxygen Plasma Processing (60 sec) | 0.179 | 63 | 44 | 35 | 30 |

TABLE 8

| Surface Treatment of Substrate (ZEONEX) | Ratio of Polar Group COO to Polar Group CC | Adhesive Force (N) Addition Amount of UVA (% by Weight) | | | |
|---|---|---|---|---|---|
| | | 0% | 0.5% | 1.1% | 2.5% |
| Not Subjected to Processing | 0 | 7 | 7 | 7 | 7 |
| Oxygen Plasma Processing (1 sec) | 0.14 | 33 | 28 | 23 | 20 |
| Oxygen Plasma Processing (60 sec) | 0.28 | 66 | 46 | 42 | 31 |

TABLE 9

| Surface Treatment of Substrate (TOPAS) | Ratio of Polar Group COO to Polar Group CC | Adhesive Force (N) Addition Amount of UVA (% by Weight) | | | |
|---|---|---|---|---|---|
| | | 0% | 0.5% | 1.1% | 2.5% |
| Not Subjected to Processing | 0 | 7 | 7 | 7 | 7 |
| Oxygen Plasma Processing (1 sec) | 0.107 | 46 | 26 | 20 | 17 |
| Oxygen Plasma Processing (60 sec) | 0.179 | 63 | 44 | 34 | 29 |

As is apparent from Tables 6 to 9, it is understood that the adhesive force is reduced as an addition amount of HALS or UVA increases in using either ZEONEX or TOPAS as a substrate. Therefore, it is understood that as with the result obtained in Experiment 2, the adhesive force is reduced but the mold-releasing properties is improved by addition of HALS or UVA to the resin composition when TOPAS is used as a substrate. Accordingly, it is understood that it is preferable that the addition amount of HALS or UVA is in a range of 0.5 to 2.0% by weight with respect to 100% by weight of a resin component as with Experiment 2.

And, the reliability of each of the optical parts subjected to the oxygen plasma processing (60 seconds) arid not subjected to processing, shown in Tables 6 to 9, was evaluated by following the same procedure as in Experiment 1. As a result of this, the results of evaluations of the reliability test showed that all the optical parts subjected to the oxygen plasma processing (60 seconds) are rated as o arid the optical parts not subjected to processing are rated as x.

In addition, ZEONEX used as a substrate is an alicyclic olefin copolymer having a structure shown below.

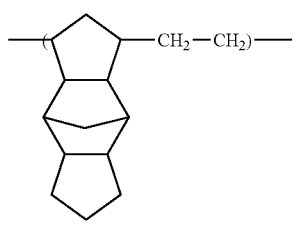

And, TOPAS used as a substrate is an alicyclic olefin copolymer having a structure shown below.

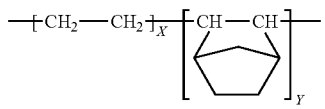

<Experiment 4>

Next, an example in which an antireflection film (AR film) was placed on the optical resin layer will be described.

A resin composition, to which the HALS and the UVA were not added, was prepared by following the same procedure as in Experiment 1, and using this resin composition, optical resin layers were formed on substrates of ZEONEX or TOPAS, and antireflection films (AR film) were prepared on these optical resin layers.

As the AR film, an antireflection film, in which a $SiO_2$ layer and a $TiO_2$ layer are alternately laminated, was formed by laminating the $SiO_2$ layer (film thickness 80 nm), the $TiO_2$ layer (film thickness 90 nm), the $SiO_2$ layer (film thickness 20 nm) the $TiO_2$ layer (film thickness 20 nm), and the $SiO_2$ layer (film thickness 30 nm) in this order. In addition, the antireflection film was formed by a vapor deposition method.

Figure 15:
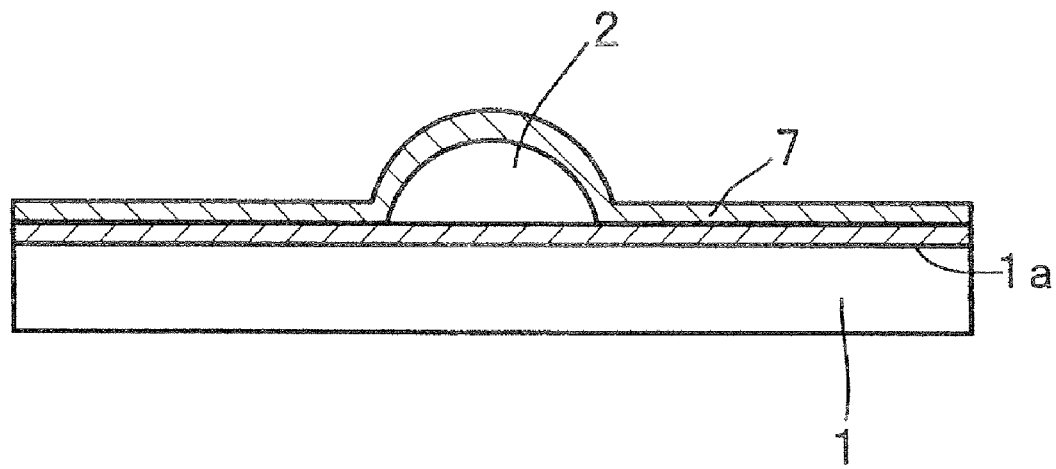
FIG. 15 is a sectional view showing an optical part in which an AR film is formed.

FIG. 15 is a sectional view showing an optical part in which the AR film is formed on the optical resin layer. As shown in FIG. 15, a plasma-processed layer 1a is formed on the surface of the substrate 1 by oxygen plasma processing. The optical resin layer 2 was formed on this plasma-processed layer 1a, and the AR film 7 was formed to cover the optical resin layer 2.

The AR film 7 is also formed on the plasma-processed layer 1a of the substrate 1 around the optical resin layer 2. In order to verify whether or not it is possible to check that the surface of the substrate 1 is in a state of being plasma-processed even after the AR film 7 is formed on the plasma-processed layer 1a like this, the AR film 7 was removed by etching with a hydrofluoric acid, and the surface of the plasma-processed layer 1a from which the AR film 7 was removed was analyzed by ESCA in the same manner as in the above case.

In addition, etching with a hydrofluoric acid was performed according to the following method.

(1) The sample was immersed in a buffered hydrofluoric acid solution (ammonium hydrogen fluoride 16%, intended for semiconductors, manufactured by DAIKIN INDUSTRIES, Ltd.) for 10 minutes to remove the AR film by etching.

(2) Next, the surface from which the AR film is removed by etching was cleaned with ultra-pure water and isopropyl alcohol.

(3) Next, a solvent is evaporated and removed by blowing a nitrogen gas.

Figure 16:
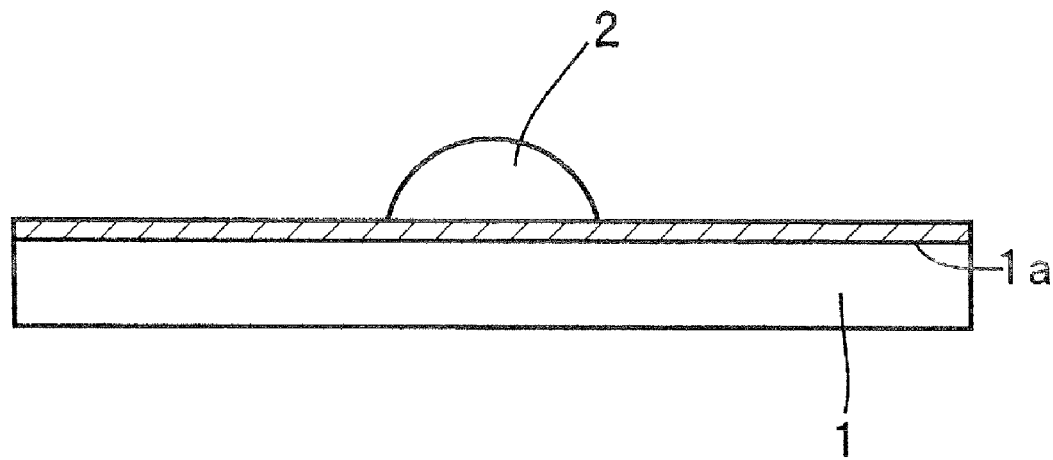
FIG. 16 is a sectional view showing an optical part after removing an AR film by etching.

FIG. 16 is a sectional view showing a state of the optical part after removing the AR film 7.

The surface of the plasma processed layer 1a, from which the AR film 7 was removed, was analyzed to measure a ratio of a polar group COO to a polar group CC. The results of measurements of the optical parts in which ZEONEX was used as a substrate are shown in Table 10, and those of the optical parts in which TOPAS was used as a substrate are shown in Table 11. In addition, in Tables 10 and 11, a ratio of a polar group COO to a polar group CC before forming the AR film 7 is shown together as "without AR film". And, a reliability test was performed in the same manner as in the above case to evaluate reliability on the optical part in which the AR film 7 is formed. The results of evaluations are shown in Table 10 and Table 11.

TABLE 10

| Plasma Processing Conditions (ZEONEX) | With AR Film Reliability Test | With AR Film Ratio of Polar Group COO to Polar Group CC | Without AR Film Ratio of Polar Group COO to Polar Group CC |
| --- | --- | --- | --- |
| Not Subjected to Processing | X | 0 | 0 |
| Oxygen Plasma Processing (1 sec) | ○ | 0.02 | 0.14 |
| Oxygen Plasma Processing (60 sec) | ○ | 0.029 | 0.28 |

TABLE 11

| Plasma Processing Conditions (TOPAS) | With AR Film Reliability Test | With AR Film Ratio of Polar Group COO to Polar Group CC | Without AR Film Ratio of Polar Group COO to Polar Group CC |
| --- | --- | --- | --- |
| Not Subjected to Processing | X | 0 | 0 |
| Oxygen Plasma Processing (1 sec) | ○ | 0.011 | 0.107 |
| Oxygen Plasma Processing (60 sec) | ○ | 0.016 | 0.179 |

As shown in Table 10 and Table 11, also in the optical part in which the AR film has been formed, it is possible to determine whether the surface of the substrate is subjected to processing such as oxygen plasma processing or not by removing the AR film 7 and analyzing the surface.

Figure 14:
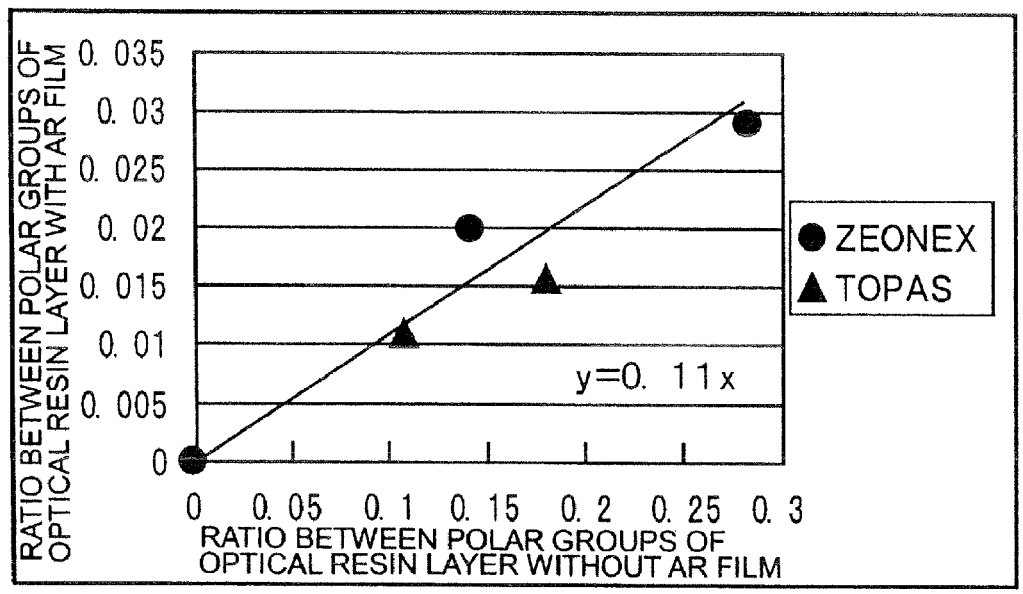
FIG. 14 is a view showing a relationship between a ratio of a polar group COO to a polar group CC of an optical resin layer without an AR film and a ratio of a polar group COO to a polar group CC of an optical resin layer with an AR film.

FIG. 14 is a view showing a relationship between the ratio of a polar group COO to a polar group CC of the optical resin layer with an AR film and the ratio of a polar group COO to a polar group CC of the optical resin layer without an AR film, which are shown in Table 10 and Table 11.

As shown in FIG. 14, it is found that the ratio of a polar group COO to a polar group CC measured after removing the AR film 7 has correlation to the ratio of a polar group COO to a polar group CC in the case of "without AR film". As shown in FIG. 14, this correlation is recognized whether the substrate is ZENOX or TOPAS. As shown in FIG. 14, it is understood that the ratio of a polar group COO to a polar group CC in the case of "with AR film" is 0.11 times that in the case of "without AR film" and is about 10% of that in the case of "without AR film". Accordingly, it is possible to estimate the ratio of a polar group COO to a polar group CC at the surface of the substrate by removing the AR film of the optical part in which the AR film has been formed and analyzing the surface.

And, as shown in the results of the reliability test in Table 10 and Table 11, it is understood that reliability can be improved by applying the oxygen plasma processing to the surface of the substrate to provide the polar group for the surface of the substrate according to the present invention even in the optical part in which the AR film is formed.

<Experiment 5>

It was investigated whether the hindered amine light stabilizer (HALS) and the ultraviolet absorber (UVA) contained in the optical resin layer can be detected from the optical resin layer in the present invention or not.

TINUVIN 292 was used as the HALS as with the above-mentioned cases, and TINUVIN 400 was used as the UVA as with the above-mentioned cases.

The detection of the HALS and the UVA was performed with a mass spectrometer.

Analyzing conditions and preparation condition of analysis samples are as follows.

(Analyzing Conditions)
Injection rate: 2 μl
Eluate: acetonitrile 100%
Flow rate: 0.5 ml/min
Ionization method: ESI positive (positive ion detection mode)

(Preparation Condition of Analysis Sample)
Liquid for dissolving a sample: acetonitrile (Analysis of Standard Sample)

10 ml of acetonitrile was added to 1.79 mg of TINUVIN 292 to prepare a 170 ppm standard sample.

Figure 9:
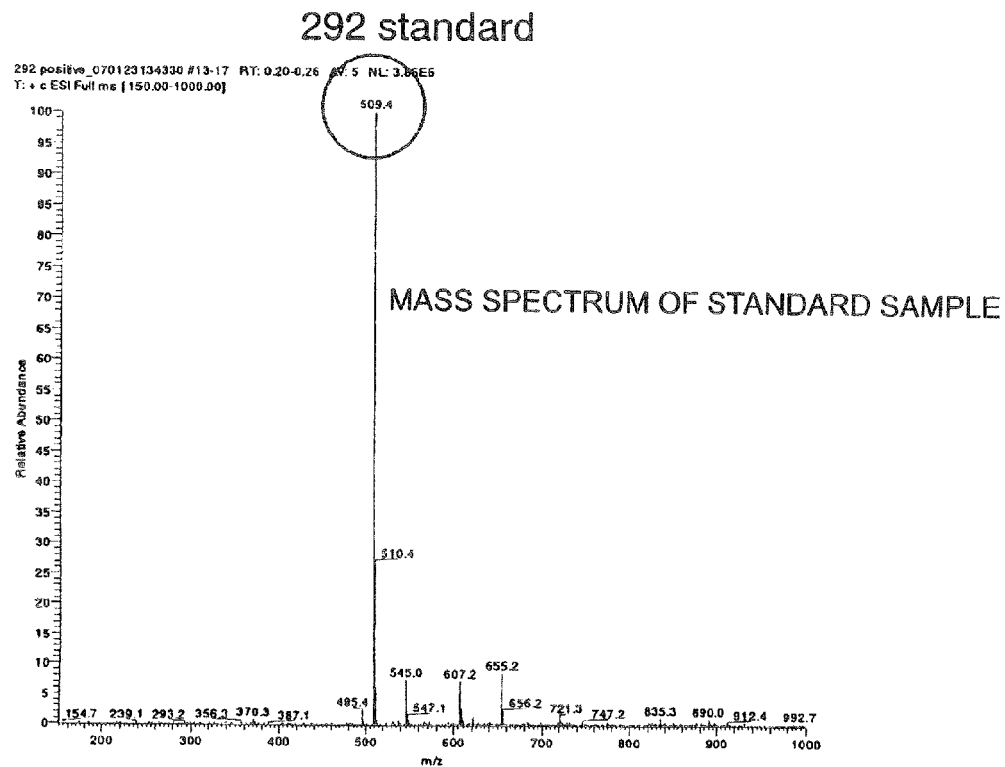
FIG. 9 is a view showing a mass spectrum of a standard sample of TINUVIN 292.

FIG. 9 is a view showing a mass spectrum of this standard sample.

Similarly, 10 ml of acetonitrile was added to 47.1 mg of TINUVIN 400 to prepare a 4710 ppm standard sample.

Figure 11:
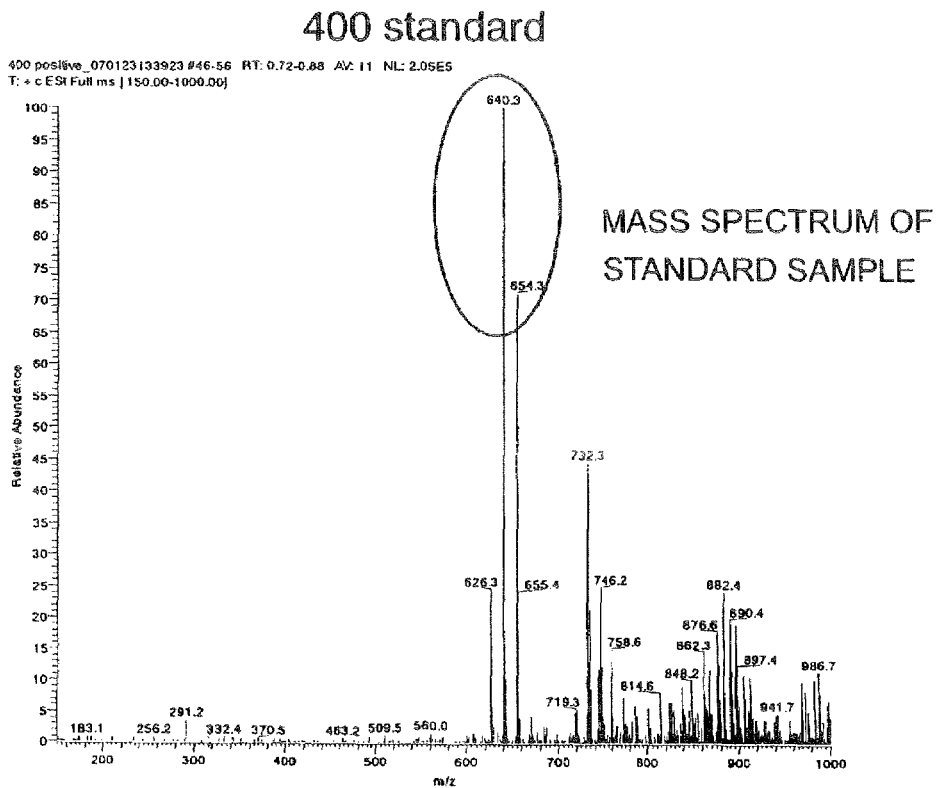
FIG. 11 is a view showing a mass spectrum of a standard sample of TINUVIN 400.

FIG. 11 is a view showing a mass spectrum of this standard sample.

As shown in FIG. 9, in the standard sample of TINUVIN 292, protonated ions in which m/z=509 (larger than a molecular weight by 1) were observed.

As for TINUVIN 400, protonated ions in which m/z=640 were observed as shown in FIG. 11.

(Analysis of Extracted Liquid from Molded Resin Article)

Figure 10:
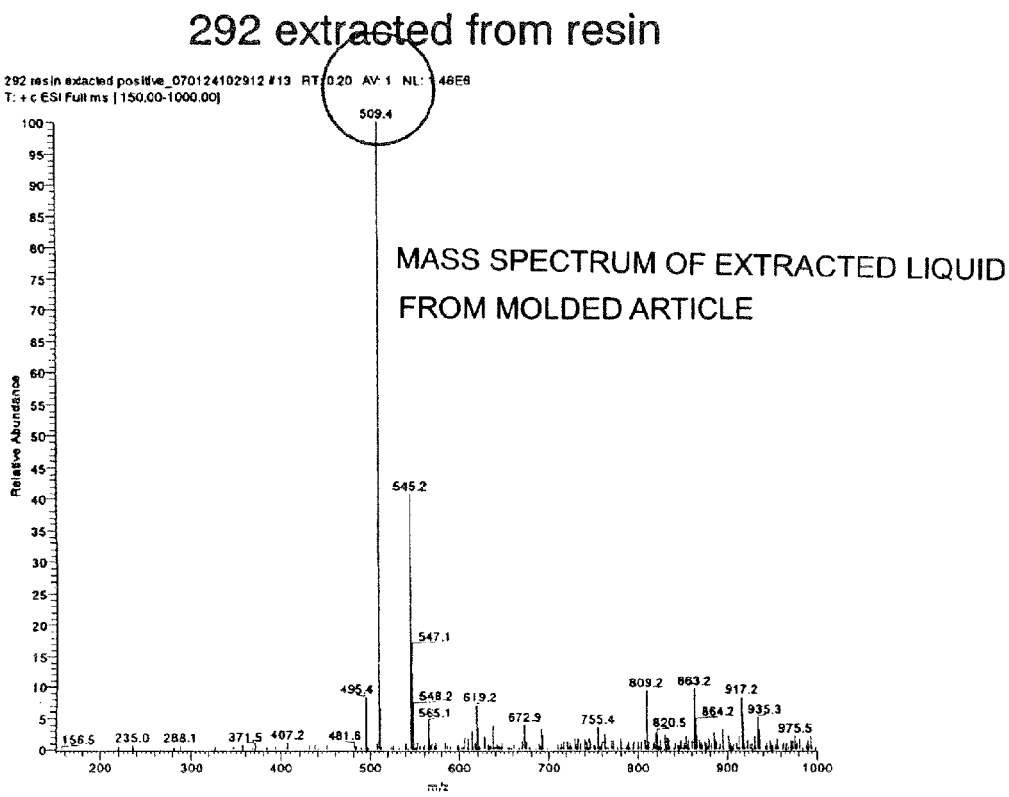
FIG. 10 is a view showing a mass spectrum of an extracted liquid from a molded article containing TINUVIN 292.

An optical resin layer in which TINUVIN 292 was contained in an amount 1.5 by weight was shaved off to prepare a sample. 3 ml of acetonitrile was added to 59.87 mg of this sample, and the resulting mixture was subjected to ultrasonic cleaning for 5 minutes to obtain an extracted liquid by acetonitrile. FIG. 10 is a view showing a mass spectrum of this extracted liquid.

Figure 12:
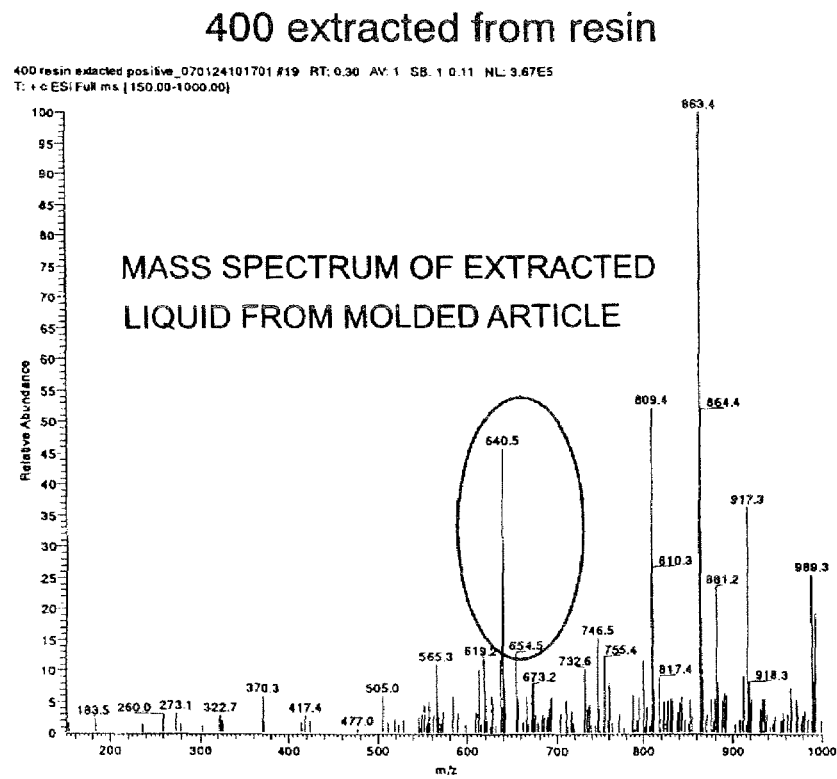
FIG. 12 is a view showing a mass spectrum of an extracted liquid from a molded article containing TINUVIN 400.

Similarly, an optical resin layer in which TINUVIN 400 was contained in an amount 1.1% by weight was shaved off to prepare a sample. 1 ml of acetonitrile was added to 116.27 mg of this sample, and the resulting mixture was subjected to ultrasonic cleaning for 5 minutes to obtain an extracted liquid. FIG. 12 is a view showing a mass spectrum of this extracted liquid.

As is apparent from FIGS. 10 and 12, it is found that protonated ions similar to those in standard samples are detected. Thereby, it was verified that the HALS and the UVA contained in the optical resin layer can be detected.

(Optical Part)

Figure 17:
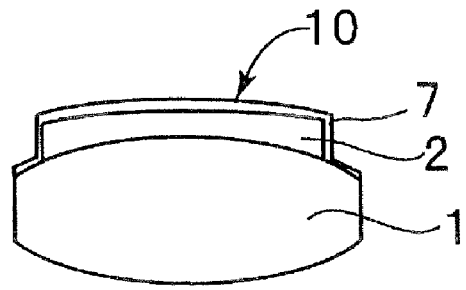
FIG. 17 is a sectional view showing a compound aspheric lens which is an embodiment of the optical part according to the present invention.

FIG. 17 is a schematic sectional view showing a compound aspheric lens which is an embodiment of the optical part according to the present invention.

In the compound aspheric lens 10 illustrated in FIG. 17, the optical resin layer 2 is formed on the substrate 1, and the antireflection film (AR film) 7 was formed on the optical resin layer 2. As the substrate 1, an alicyclic olefin copolymer such as ZEONEX or TOPAS can be used as described above. The optical resin layer 2 can be molded on the substrate 1 with a mold by use of the above resin composition to be formed. For example, the above-mentioned resin composition is added dropwise onto the substrate 1, and this resin composition is pressed from above with a mold, and an optical resin layer 2 can be formed by irradiating ultraviolet light from the opposite side of the substrate 1 with the resin composition pressed with the mold to cure the resin composition. Ultraviolet irradiation can be performed at intensity of 300 mW/cm$^2$ at irradiating time of 2 minutes using light whose principal component is, for example, ultraviolet light with a wavelength of 365 nm. The AR film 7 can be formed by alternately laminating the $SiO_2$ layer and the $TiO_2$ layer by a vapor deposition method as described above.

A thickness of a center portion of the substrate 1 is, for example, 1.7 mm, and a thickness of a center portion of the optical resin layer 2 is, for example, 260 μm.

In accordance with the present invention, an optical part, which is superior in the adhesion between the optical resin layer 2 and the substrate 1 and is superior in the reliability, can be formed. And, since the optical part having high production efficiency can be formed, a low cost compound aspheric lens can be formed. Further, since the optical resin layer has high adhesion, the optical resin layer 2 can contain a large amount of a component with high refractive index, and therefore it is possible to reduce a thickness of the optical resin layer to make the optical part a low profile part.

Figure 18:
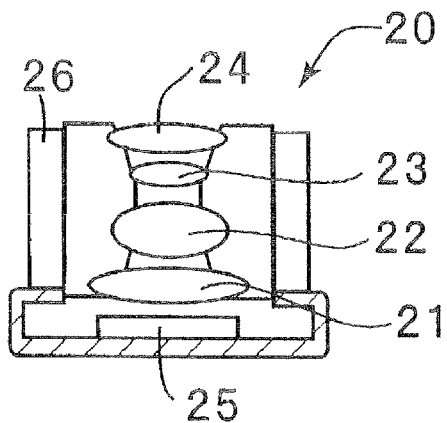
FIG. 18 is a sectional view showing an example of a camera module using a compound aspheric lens of an embodiment of the present invention.

FIG. 18 is a schematic sectional view showing a camera module of an embodiment according to the present invention. As shown in FIG. 18, two plastic aspheric lenses 21 and 22 and two glass spheric lenses 23 and 24 are equipped on an image pickup device 25, and these lenses are held by a focusing mechanism 26.

A camera module 20 has four lenses 21, 22, 23, 24, and can be used, for example, as a camera module of 2 to 5 mega pixel for mobile-phones. By combining a plurality of lenses, required magnification is secured, and various aberrations including chromatic aberration which is essential to a lens for a photo camera are corrected for. For example, in an example shown in FIG. 18, design of cancelling chromatic aberration by setting an Abbe number of at least one of the spheric lenses 23 and 24 higher, and setting an Abbe number of at least one of the plastic aspheric lenses 21 and 22 lower is performed.

The compound aspheric lens according to the present invention, shown in FIG. 17, can be used for at least one of the aspheric lenses 21 and 22. By employing the compound aspheric lens of the present invention, the reliability of a camera can be improved, and a cost reduction and a low profile camera can be realized.

Figure 19:
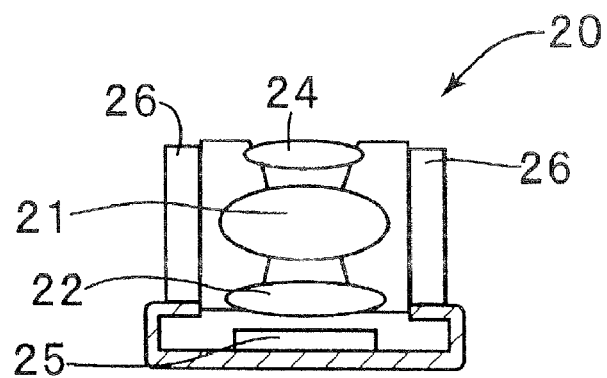
FIG. 19 is a sectional view showing another example of a camera module using a compound aspheric lens of an embodiment of the present invention.

FIG. 19 is a schematic sectional view showing another example of a camera module of an embodiment of the optical part according to the present invention. Here, a compound aspheric lens has functions of two lenses, lenses 23 and 24 shown in FIG. 18. Therefore, the optical part can be a low profile part. Preferably, the optical resin layer of the compound aspheric lens is formed at a position other than the outermost surface among lenses at respective positions. By employing such camera module as shown in FIG. 19, a height of the camera can be lowered by, for example, about 1 mm compared with the camera module shown in FIG. 18. For example, when a height of the camera module shown in FIG. 18 is about 10 mm, a height of the camera module shown in FIG. 19 can be about 9 mm.

Figure 20:
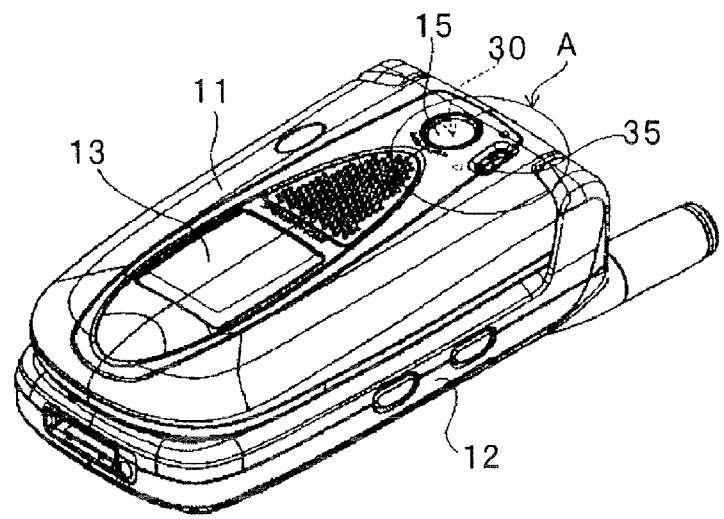
FIG. 20 is a perspective view showing a mobile-phone in which a camera module using a compound aspheric lens of an embodiment of the present invention is housed.

FIG. 20 is a perspective view showing a mobile-phone using a camera module shown in FIG. 19. As shown in FIG. 20, in this mobile-phone, a first housing 11 and a second housing 12 are releasably coupled to each other, and a sub-display 13 and a transparent window 15 are equipped on the backside of the first housing 11. A camera assembly 30 described later is located inside the transparent window 15. A main display (not shown) is equipped at the surface of the first housing 11. A plurality of operational keys (not shown) are equipped at the surface of the second housing 12. A switching lever 35 for shifting a lens, for example, from a standard position to a close-up position is equipped at a location, denoted by a symbol A, of the first housing 11, in which the camera assembly 30 is equipped.

Figure 21:
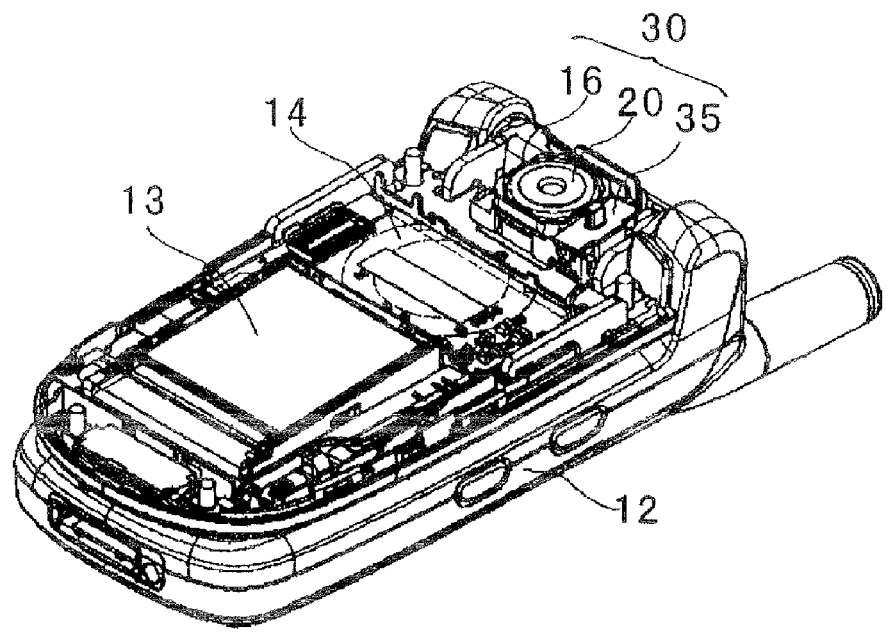
FIG. 21 is a perspective view showing a state in which a cover of a first housing of the mobile-phone shown in FIG. 20 is removed.

FIG. 21 shows a state in which a cover of the first housing 11 is removed As shown in FIG. 21, the camera assembly 30 is composed of the camera holder 16, the camera module 20, and the switching lever 35. An LCD assembly 14 is equipped between the sub-display 13 and the camera assembly 30.

Figure 22:
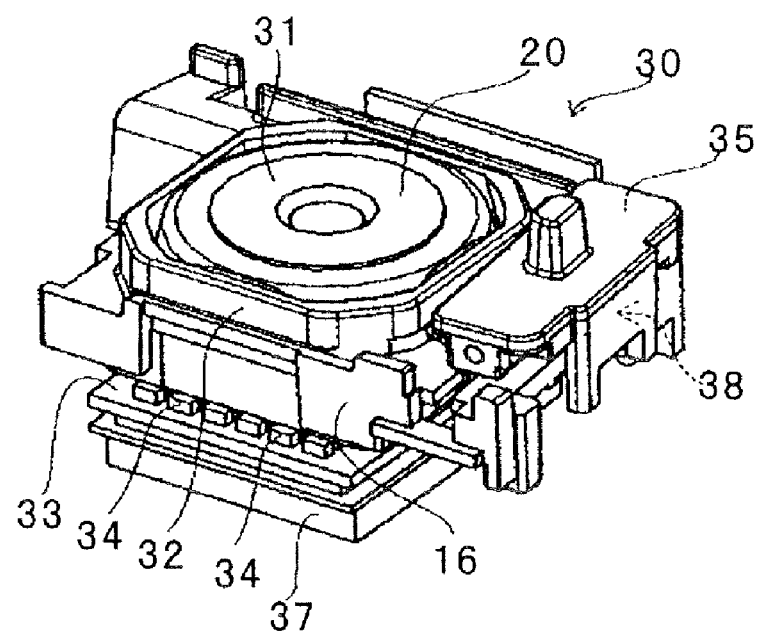
FIG. 22 is an enlarged perspective of a camera assembly shown in FIG. 21.

FIG. 22 is an enlarged perspective view of the camera assembly 30. A lens in the camera module 20 is held by a lens holder 31, and a frame 34 is placed out side the lens holder 31. And, in a camera body 38, a circuit board 33 is placed on a flexible pad 37, and a plurality of electrodes 34 are attached to the circuit board 33.

As the camera module 20 shown in FIG. 22, the camera module shown in FIG. 19 can be used. Therefore, the reliability of a camera for mobile-phones can be improved and a cost reduction and a low profile camera can be realized.

In the above-mentioned embodiment, a camera module for mobile-phones is shown, but the camera module using the optical part, such as a compound aspheric lens, of the present invention can also be used for a single-lens reflex camera and a vehicle-mounted camera.

What is claimed is:

1. An optical part for a camera comprising a substrate made of a polyolefin plastic and an optical resin layer provided on the substrate,
    wherein the surface of the substrate is provided with a polar group and the optical resin layer is formed from a resin composition including a fluorene compound having a (meth)acryloyl group.

2. The optical part for a camera according to claim 1, wherein the resin composition further includes metal alkoxide and a (meth)acrylate monomer.

3. The optical part for a camera according to claim 1, wherein a ratio of a bond COO to a bond C—C at the surface of the substrate is 0.06 or more.

4. The optical part for a camera according to claim 1, wherein a hindered amine light stabilizer and/or an ultraviolet absorber is added to the resin composition.

5. The optical part for a camera according to claim 4, wherein the addition amount of a hindered amine light stabilizer and an ultraviolet absorber in the resin composition is 0.5 to 2.0% by weight.

6. The optical part for a camera according to claim 1, wherein the optical resin layer is formed by molding with a mold.

7. A method of fabricating the optical part for a camera according to claim 1 comprising the steps of
    providing a polar group for the surface of the substrate by applying plasma processing to the surface of the substrate; and
    placing the resin composition on the surface of the substrate provided with a polar group and curing the resin composition with a mold pressed against the resin composition to form the optical resin layer.

8. The method of fabricating the optical part for a camera according to claim 7, wherein the step of curing the optical resin layer is performed by curing through ultraviolet irradiation.

9. The method of fabricating the optical part for a camera according to claim 7, wherein the plasma processing is oxygen plasma processing.

* * * * *